United States Patent
Kao

[11] Patent Number: 6,070,518
[45] Date of Patent: Jun. 6, 2000

[54] PRESSURE COOKER

[76] Inventor: Yao-Tzong Kao, 58, Ma Yuan West Street, Taichung, Taiwan

[21] Appl. No.: 09/480,704

[22] Filed: Jan. 7, 2000

[51] Int. Cl.$^7$ .............................. A23L 1/00; A47J 27/00; A47J 27/06; A47J 37/00; H05B 1/02
[52] U.S. Cl. .............................. 99/332; 99/331; 99/337; 99/403; 219/492; 219/497; 219/453; 219/506; 220/314; 220/316; 220/912
[58] Field of Search ............................ 99/325–333, 337, 99/338, 403–410, 447, 449, 483; 126/369, 39 G, 39 R; 219/492, 494, 497, 506, 453, 452, 448, 501; 220/592, 246, 315, 393, 486, 489, 314, 316, 912; 324/663, 686; 426/510, 523, 231, 233

[56] References Cited

U.S. PATENT DOCUMENTS

| | | | |
|---|---|---|---|
| 3,806,701 | 4/1974 | Scott | 219/438 |
| 3,908,111 | 9/1975 | Du Bois et al. | 219/442 |
| 4,005,645 | 2/1977 | Janssen | 99/403 |
| 4,039,777 | 8/1977 | Baker | 219/442 X |
| 4,298,789 | 11/1981 | Eichelberger et al. | 219/521 X |
| 4,307,287 | 12/1981 | Weiss | 219/432 X |
| 4,932,527 | 6/1990 | Hayes | 99/331 |
| 5,348,187 | 9/1994 | Schultz | 126/373 X |
| 5,355,777 | 10/1994 | Chen et al. | 99/410 X |
| 5,400,700 | 3/1995 | Bois | 99/403 |
| 5,520,103 | 5/1996 | Zielinski et al. | 126/246 X |
| 5,673,611 | 10/1997 | Tieman | 99/415 X |

*Primary Examiner*—Timothy Simone

[57] ABSTRACT

A pressure cooker has a main body, a cover disposed on a top portion of the main body, an exhaust steam valve disposed on the cover, a heat conductive disk disposed on a bottom of the main body, the heat conductive disk having a center hole receiving a temperature switch, the temperature switch disposed on a bottom center of the main body, an electric heating pipe disposed on a bottom of the heat conductive disk, and a base seat having a hollow interior receiving a lower portion of the main body, the heat conductive disk, the temperature switch, and the electric heating pipe. A timer switch and an electric source switch are disposed on the base seat.

2 Claims, 3 Drawing Sheets

PRESSURE COOKER

BACKGROUND OF THE INVENTION

The present invention relates to a pressure cooker. More particularly, the present invention relates to a pressure cooker which has a temperature switch as a temperature sensor.

Referring to FIG. 3, a conventional pressure cooker has a main body 10, a cover 20 disposed on a top portion of the main body 10, and an exhaust steam valve 201 disposed on the cover 20. When beans or powders of food are cooked, the exhaust steam valve 201 will be choked easily. Therefore, an inner pressure of the conventional pressure cooker will be increased so that the conventional pressure cooker may be exploded.

SUMMARY OF THE INVENTION

An object of the present invention is to provide a pressure cooker which has a temperature switch as a temperature sensor in order to disconnect an electric heating pipe from an electric source.

Another object of the present invention is to provide a pressure cooker which has a timer switch in order to determine a period of cooking.

Accordingly, a pressure cooker comprises a main body, a cover disposed on a top portion of the main body, an exhaust steam valve disposed on the cover, a heat conductive disk disposed on a bottom of the main body, the heat conductive disk having a center hole receiving a temperature switch, the temperature switch disposed on a bottom center of the main body, an electric heating pipe disposed on a bottom of the heat conductive disk, and a base seat having a hollow interior receiving a lower portion of the main body, the heat conductive disk, the temperature switch, and the electric heating pipe.

DETAILED DESCRIPTION OF THE INVENTION

Figure 1:
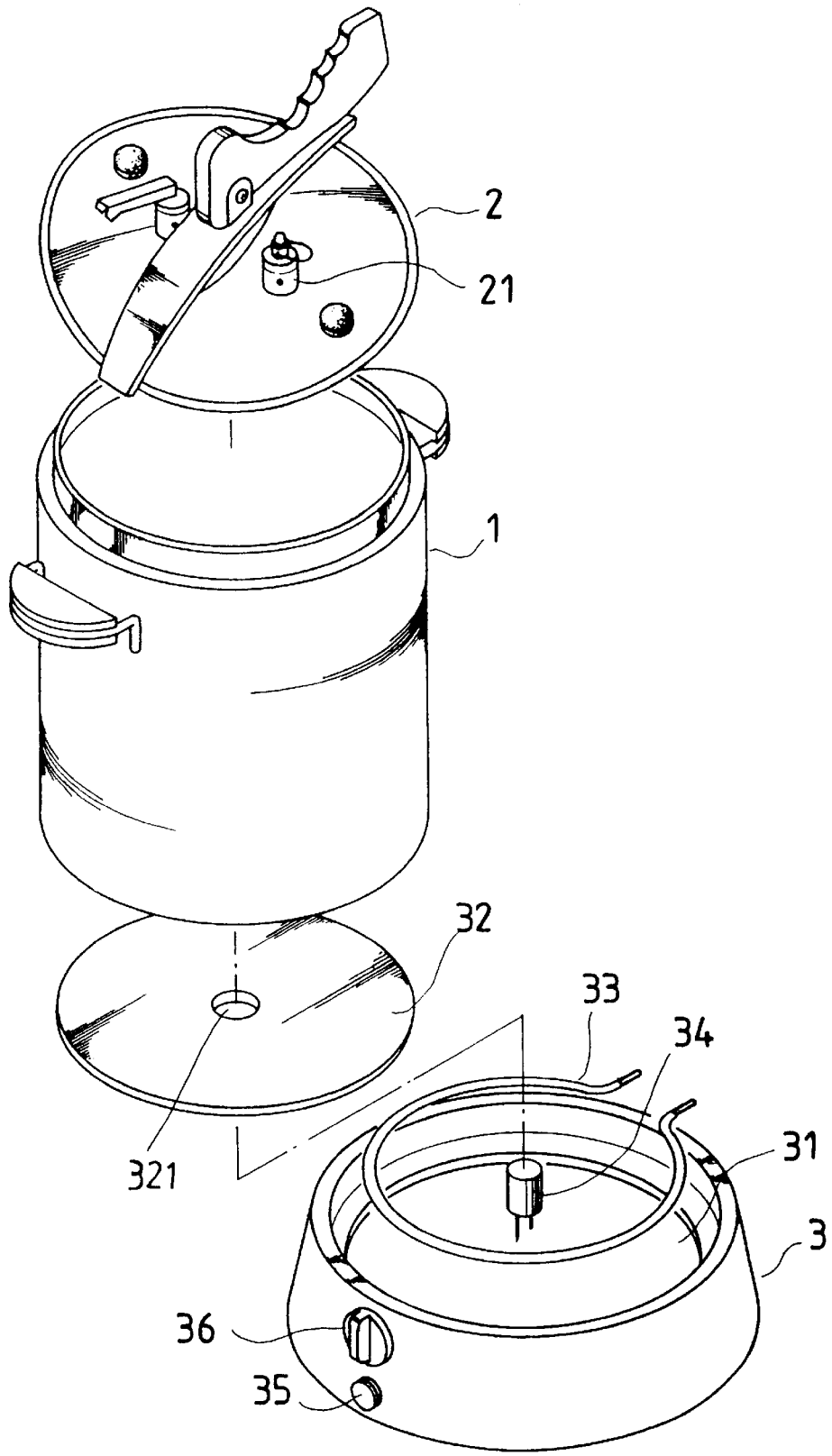
FIG. 1 is a perspective exploded view of a pressure cooker of a preferred embodiment in accordance with the present invention.
Figure 2:
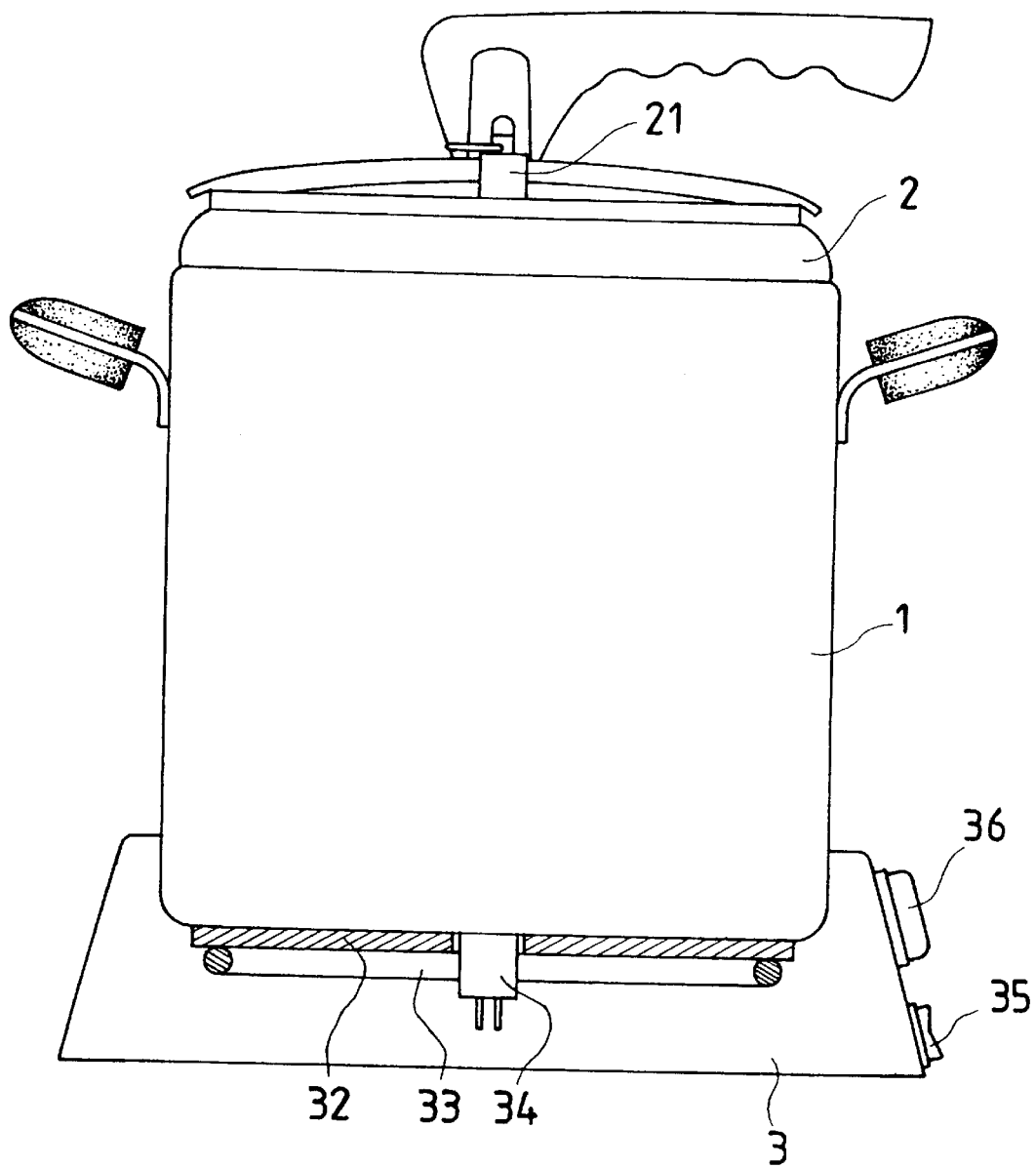
FIG. 2 is a partially sectional assembly view of a pressure cooker of a preferred embodiment in accordance with the present invention.
Figure 3:
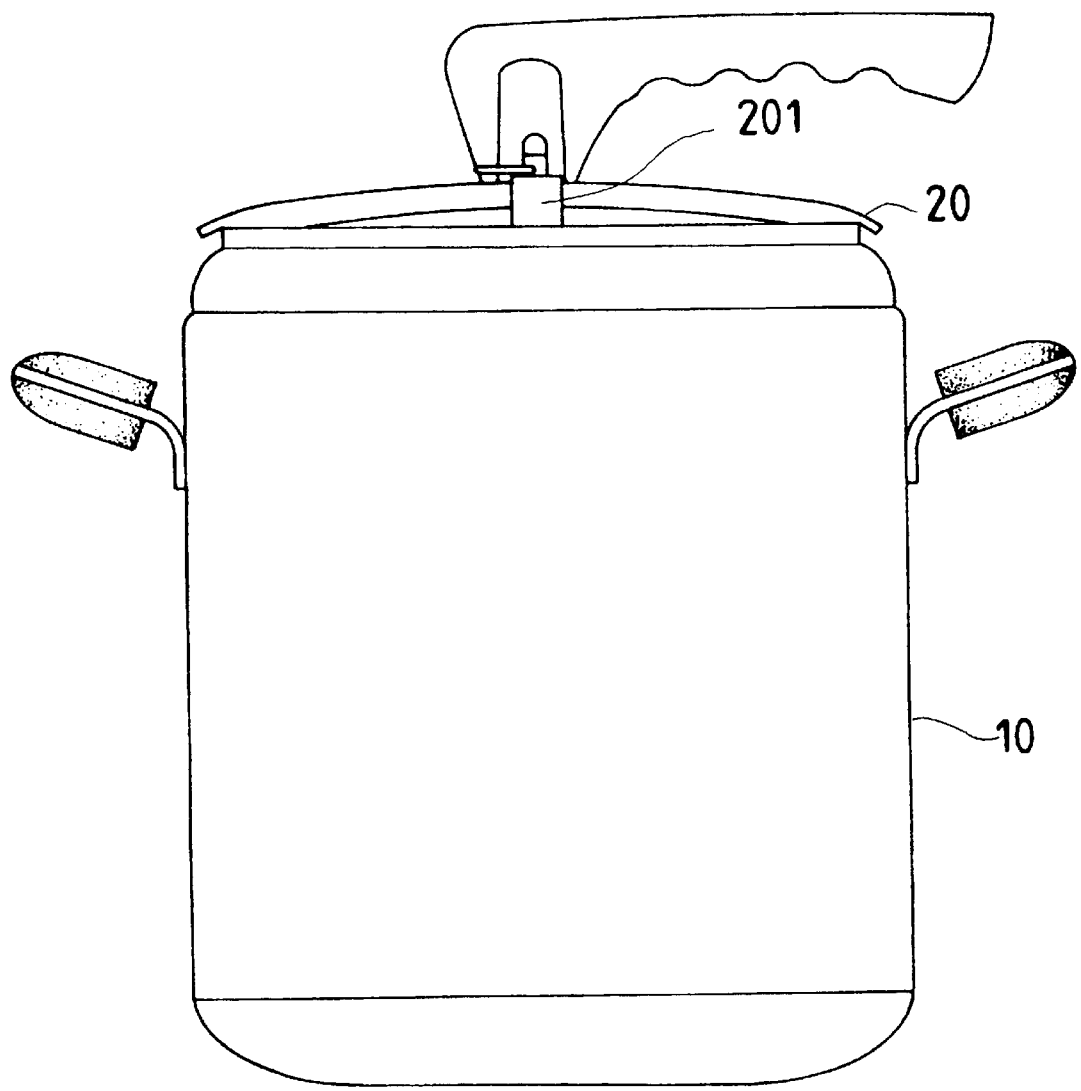
FIG. 3 is an elevational view of a pressure cooker of the prior art.

Referring to FIGS. 1 and 2 first, a pressure cooker comprises a main body 1, a cover 2 disposed on a top portion of the main body 1, an exhaust steam valve 21 disposed on the cover 20, a heat conductive disk 32 disposed on a bottom of the main body 1, the heat conductive disk 32 having a center hole 321 receiving a temperature switch 34, the temperature switch 34 disposed on a bottom center of the main body 1, an electric heating pipe 33 disposed on a bottom of the heat conductive disk 32, and a base seat 3 having a hollow interior 31 receiving a lower portion of the main body 1, the heat conductive disk 32, the temperature switch 34, and the electric heating pipe 33.

Referring to FIG. 2 again, a timer switch 36 and an electric source switch 35 are disposed on the base seat 3.

When the food inside the main body 1 is boiling, the temperature switch 34 senses the temperature of the main body 1 in order to disconnect the electric heating pipe 33 from an electric source. Therefore, the inner pressure of the main body 1 will not be increased.

When the timer switch 36 is turned on, the timer switch 36 can determine and control a period of cooking.

The invention is not limited to the above embodiment but various modification thereof may be made. Further, various changes in form and detail may be made without departing from the scope of the invention.

I claim:

1. A pressure cooker comprising a main body, a cover disposed on a top portion of the main body, and an exhaust steam valve disposed on the cover, characterized in that:

a heat conductive disk is disposed on a bottom of the main body, the heat conductive disk has a center hole receiving a temperature switch, the temperature switch is disposed on a bottom center of the main body, an electric heating pipe is disposed on a bottom of the heat conductive disk, and a base seat has a hollow interior receiving a lower portion of the main body, the heat conductive disk, the temperature switch, and the electric heating pipe.

2. A pressure cooker as claimed in claim 1, wherein a timer switch and an electric source switch are disposed on the base seat.

* * * * *